United States Patent [19]

Laferty et al.

[11] 4,450,144

[45] May 22, 1984

[54] AMMONIUM HYDROXIDE STRIPPING OF TUNGSTEN FROM ORGANIC SOLVENTS

[75] Inventors: John M. Laferty, Wheat Ridge; Paul B. Queneau, Golden; Leo W. Beckstead, Arvada, all of Colo.

[73] Assignee: Amax Inc., Greenwich, Conn.

[21] Appl. No.: 400,539

[22] Filed: Jul. 21, 1982

Related U.S. Application Data

[63] Continuation of Ser. No. 225,903, Jan. 19, 1981, abandoned.

[51] Int. Cl.$^3$ .............................................. C01G 41/00
[52] U.S. Cl. ........................................ 423/54; 423/53; 75/101 BE
[58] Field of Search ................. 423/53, 54; 75/101 BE

[56] References Cited

U.S. PATENT DOCUMENTS 3,158,438 11/1964 Kurtak et al. ............................ 23/22
4,092,400 5/1978 Zbranek et al. ........................ 423/54
4,148,862 4/1979 Fugleberg et al. .................. 423/106

FOREIGN PATENT DOCUMENTS

68/4892 of 1968 South Africa .

OTHER PUBLICATIONS

Yih & Wang, Tungsten: Sources, Metallurgy, Properties & Applications, (1979), p. 108.
Petrov, Maslenitskii, et al., "Using Amines to Extract Tungsten . . . ", Tsvetnye Metally, V. 11–19, (1970), pp. 45–56.
Parker, "Mixing . . . ", in Chemical Engineering, 71 (12), Jun. 8, 1964, pp. 165–220.

Primary Examiner—Herbert T. Carter
Attorney, Agent, or Firm—Michael A. Ciomek; Donald T. Black

[57] ABSTRACT

A process for stripping tungsten values from a tungsten-bearing acidic liquid organic phase into a basic aqueous ammoniacal stripping solution comprises mixing the organic phase and the stripping solution with a high-shear mixing device to maximize the pH gradient between the organic phase and the aqueous solution whereby growth of any precipitated ammonium paratungstate crystals is minimized and the dissolution thereof is maximized and to strip the tungsten values from the organic phase into the stripping solution.

6 Claims, 2 Drawing Figures

AMMONIUM HYDROXIDE STRIPPING OF TUNGSTEN FROM ORGANIC SOLVENTS

This is a continuation of application Ser. No. 225,903, filed Jan. 19, 1981 and now abandoned.

BACKGROUND OF THE INVENTION

1. Field of the Invention

The present invention relates to the recovery of tungsten from its ores, particularly as a compound such as ammonium paratungstate (APT). In particular, the present invention relates to the treatment of an aqueous solution containing sodium tungstate ($Na_2WO_4$) and dissolved impurities to recover an aqueous solution of ammonium tungstate via extraction of tungstate values from the aqueous sodium tungstate solution into an acidic organic phase, followed by stripping of the tungsten values from the organic phase into a basic aqueous ammoniacal solution. More particularly, the present invention relates to improvements in the process of stripping the tungsten-rich organic phase with the ammoniacal aqueous solution.

Tungsten is frequently recovered from its ore by a series of steps including alkali digestion of the ore to recover an aqueous solution of sodium tungstate. Following removal of impurities such as silica and molybdenum from this aqueous solution, it is passed through solvent extraction and stripping steps to produce an aqueous solution of ammonium tungstate that should be essentially free from sodium ions and should contain only minor amounts of sulphate ion. In the extraction step, the sodium tungstate solution is mixed under acidic conditions in several stages with a water-immiscible organic phase comprising, for instance, an alkylamine diluted in kerosene, and substantial amounts of tungsten values pass into the organic phase. The aqueous-organic mixture is then allowed to separate into two discrete phases. The mixing and separating operations of the extraction step can be performed in mixer-settler units of conventional design. The tungsten-enriched organic phase is typically washed, and then conveyed to the stripping step.

The stripping step comprises one or more stages each comprising a stripping unit and a phase separation unit such as a settler. In the stripping unit, the tungsten-bearing organic phase is mixed with an aqueous stripping solution of ammonia which also contains some ammonium tungstate in solution. Tungsten values are stripped from the organic phase into the aqueous ammoniacal stripping solution, forming a mixture of the tungsten-depleted organic phase and a tungstate-enriched aqueous solution. The mixture is then separated, for instance by allowing the aqueous solution to settle from the organic phase in the settler. The stripped organic phase can be washed and recycled to the extraction step, and the tungstate-rich aqueous solution is processed for the recovery of, e.g., solid ammonium paratungstate (($NH_4$)$_{10}W_{12}O_{41}$) (APT) crystals.

In practice, however, the conditions under which conventional stripping techniques have been carried out previously have favored the formation in the stripping unit of solid reaction products, particularly APT, which interfere with the normal operation of the settler. It is desirable that the aqueous and organic phases form two sharply divided layers in the settling stage as quickly as possible, to maximize efficient recovery of tungsten while minimizing contamination of the product, but solid reaction products that are formed in the stripping unit and are carried into the settler interfere with the separation that must be attained between the organic and aqueous phases. Since solids that are carried into the settler generally do not redissolve there, the solids must be dealt with before reaching the settler. Physically removing the solids necessitates additional process time and equipment, and to the extent that the removed material contains tungsten its removal represents a decrease in the amount of tungsten which would otherwise report to subsequent recovery stages. Thus, the formation of APT or other solid reaction products in the stripping unit should be minimized.

Past efforts directed toward minimizing the formation of APT in the stripping unit have met with less than complete success, while imposing restrictive and expensive requirements as to equipment size and as to operating conditions and controls. Thus, there is a need for a process for stripping a high percentage of tungsten values from the organic phase into the aqueous ammoniacal solution quickly while minimizing the formation of solid APT.

2. Description of the Prior Art

Previous techniques for stripping tungsten have dealt with the formation of solids in the stripping unit by increasing the size and/or number of mixing compartments so as to provide enough residence time for the solids to redissolve before the liquid passes to the settler. This approach increases overall process time, and raises costs, for a given amount of production.

Also, the prior art has favored operating the stripping unit with relatively dilute concentrations of ammonium tungstate so as to lessen the proximity to saturation of the aqueous phase with respect to tungsten, and thus minimize formation of APT solids in the stripping unit. These techniques require the operator to sacrifice rate of production as well as flexibility of operating conditions, and they require wasteful commitment of equipment capacity. In particular, the load on the APT crystallizer is increased due to the relatively low $WO_3$ concentration of the ammoniacal liquor fed to the crystallizer and the larger quantity of water that must be evaporated.

South African published patent application Ser. No. 68-492 shows the inevitability with which the prior art has viewed both the formation of undesired solids in the stripping column and the need for sizing the equipment so as to allow the undesired solids to redissolve in the stripping column. The applicant teaches stripping tungstate from an organic-amine phase by feeding the organic phase into the side of a column agitated by a marine-type propeller lying in a horizontal plane just above the top of the side inlet. The applicant states that upon initial contact of the loaded organic phase with the stripping solution in accordance with the disclosed method there occurs some precipitation of a "white, tungsten-containing compound" which redissolves before reaching the settler stage "providing the column is of sufficient length". It is submitted that this teaching suggests increasing the size and, therefore, the residence time of the stripping unit in order to keep APT solids from passing into the settler.

In the South African application, an aqueous ammonium tungstate strip liquor containing 350 to 370 gpl of $WO_3$ is formed by contacting the organic phase with a stripping solution having a pH of 10 to 11 and containing 20 to 125 gpl $WO_3$. The preferred $WO_3$ concentration in the stripping solution is 100 gpl or less, such as 20 to 40 or 50 gpl; it is believed that the lower $WO_3$ concentrations are preferred in order to reduce the formation of solid APT in the stripping unit.

U.S. Pat. No. 4,092,400 describes stripping an organic phase containing 100 to 150 gpl of $WO_3$ with an aqueous solution containing about 1.3 wt.-% ammonia. Solid APT forms on contact between the organic and aqueous phases, and a retention time of at least 10 minutes is required to assure that the APT solids that form are redissolved.

The prior art thus has not recognized the particular combination of conditions under which as tungsten-laden acidic organic stream can be stripped of tungsten values in a short residence time without passage of undesired solids to the settling unit.

SUMMARY OF THE INVENTION

Generally speaking, the present invention comprises a process for stripping tungsten values from a tungsten-bearing acidic liquid organic phase into a basic aqueous ammoniacal stripping solution comprising mixing the organic phase and the stripping solution with a high-shear mixing device to maximize the pH gradient between the organic phase and the aqueous solution whereby growth of any precipitated ammonium paratungstate crystals is minimized and dissolution thereof is maximized and to strip the tungsten values from the organic phase into the stripping solution. The invention can be carried out in a stripping unit by feeding an aqueous ammoniacal stripping solution to the stripping unit, establishing a zone of high shear comprising an intimate mixture of the organic and aqueous phases with the high-shear mixing device, and, feeding the acidic liquid organic phase to the zone of high shear, wherein high-shear mixing is imparted to the organic phase which is effective to strip tungsten values from the organic phase into the aqueous ammoniacal stripping solution.

DETAILED DESCRIPTION OF THE INVENTION

The present invention relates in particular to the conditions under which the organic and aqueous phases are contacted with each other in a stripping unit such that tungsten values are stripped from the organic phase into the aqueous phase in a short residence time without the carryover of unwanted solids reaction products into the settling unit. By "solid reaction products" is meant solid APT and solid silica-based compounds that can form in the stripping unit during mixing of the acidic organic tungsten-laden stream with the basic aqueous ammoniacal stripping solution.

Figure 1:
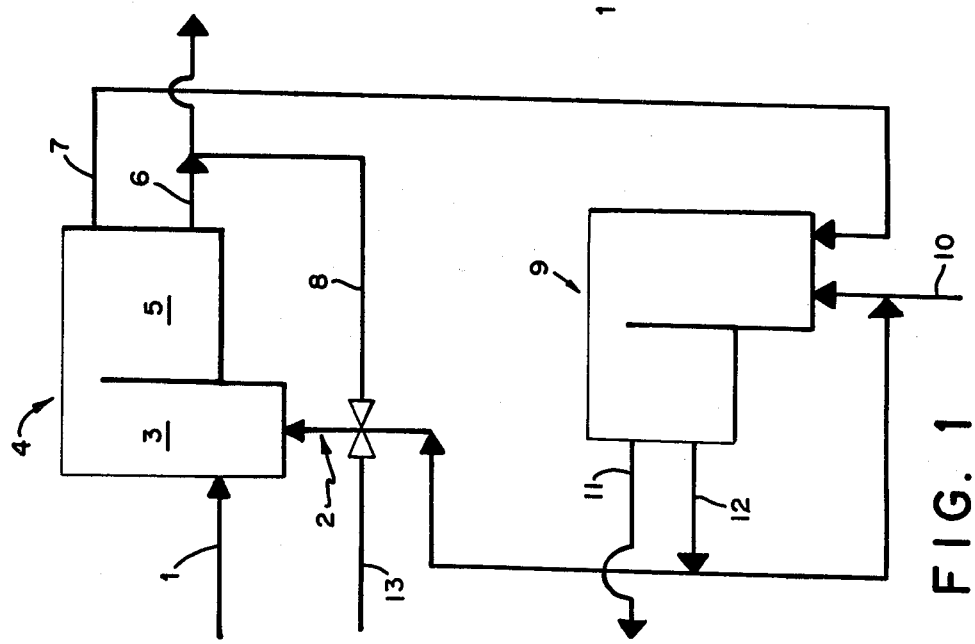
FIG. 1 is a schematic flowsheet of the stripping step.

With reference to FIG. 1, stream 1 comprises a tungsten-bearing acidic liquid organic phase such as is produced by solvent extraction of an aqueous tungstate leach liquor, and stream 2 comprises an aqueous ammoniacal stripping solution. Streams 1 and 2 are fed separately to stripping unit 3, which can comprise the mixer section of a mixer-settler unit 4.

Stream 1 can comprise a tungten-bearing organic phase produced by the extraction process described in a patent application, filed on even date herewith and assigned to the assignee of the present application, entitled "Solvent Extraction of Tungsten from Aqueous Tungstate Solutions" (Ser. No. 06/225,906) which is incorporated herein by reference.

The organic and aqueous phases are mixed in stripping unit 3, and the mixture of liquids is then conveyed to settler unit 5 from which stream 6, comprising the aqueous stripping solution now enriched in tungstate (the "strip liquor"), and stream 7, comprising the organic phase now depleted of tungsten values, are recovered. An aqueous recycle stream 8 is drawn off of stream 6 and recycled to stripping unit 3. The remaining portion of the strip liquor is conveyed to crystallizers in which water is evaporated from the strip liquor and APT is recovered. Organic stream 7 is washed at washing stage 9 with deionized water 10 to remove entrained ammonia and tungsten. The washed organic stream 11 is recycled to the solvent extraction step, and a stream 12 of wash water containing small amounts of $NH_3$ and tungstate is recycled to stripping unit 3.

Stream 1 can comprise a tungsten-loaded organic stream produced by solvent extraction of an aqueous solution of, for instance, sodium tungstate, advantageously followed by a water wash stage to remove entrained aqueous liquid from the organic stream. Stream 1 typically comprises an organic diluent, such as kerosene or a mixture of linear aliphatic hydrocarbons 10 to 13 carbon atoms in length, in which is dissolved about 2 to about 20 vol. % of an alkylamine extractant such as ditridecyl amine, and optionally about 2 to about 25 vol. % of an alkanol conditioning agent such as isodecyl alcohol. The alkylamine extractant is loaded with about 1 to about 200 gpl of $WO_3$, and can also contain traces of anionic silica impurity that has been loaded along with the tungsten. Advantageously, the $WO_3$ concentration is about 10 to about 140 gpl, and more advantageously about 25 to about 100 gpl, to provide an increased rate of production of the final tungstate product (e.g. APT).

Stream 2 comprises an aqueous ammoniacal stripping solution containing free ammonia, supplied as fresh $NH_4OH$ in stream 13. While the free ammonia concentration can be between about 2 to about 80 gpl, it is advantageously about 10 to about 60 gpl and more advantageously about 15 to about 30 gpl to provide efficient stripping of tungsten from the organic phase. The pH of stream 2 is about 9.0 to about 11.5, and advantageously about 9.5 to about 11.0 to optimize stripping of tungsten values from the organic phase.

It is advantageous that the aqueous stream 2 contain dissolved ammonium tungstate as well as free ammonia, to permit recovery of a tungstate-laden strip liquor containing a high concentration of tungstate. Again referring to FIG. 1, stream 6, containing the aqueous strip liquor, is conveyed from the settling unit to the crystallizers in which water and ammonia are volatilized, and APT is formed; higher concentrations of tungstate in the strip liquor advantageously require less time and energy to drive off water and ammonia in the APT crystallizers. Thus, to provide a high concentration of tungstate in the strip liquor, recycle stream 8 comprising ammonium tungstate in solution is drawn off of stream 6 and fed to stripping unit 3 together with fresh ammoniacal feed (e.g. $NH_4OH$) and recycled water from washing stage 9. Thus, stream 2 also contains about 25 to about 200 gpl $WO_3$, and advantageously about 100 to about 175 gpl $WO_3$ to optimize recovery of a satisfactory concentration of $WO_3$ in the strip liquor. It is a surprising and advantageous feature of the present invention that a stripping unit can be operated with so high a $WO_3$ concentration and a short residence time without passage of solid reaction products out of the stripping unit.

The concentration of tungstate in the strip liquor (stream 6) is typically about 50 to about 300 gpl $WO_3$; advantageously it is about 100 to about 275 gpl $WO_3$, and more advantageously about 150 to about 250 gpl $WO_3$, to permit more economical operation in the crystallizer.

Figure 2:
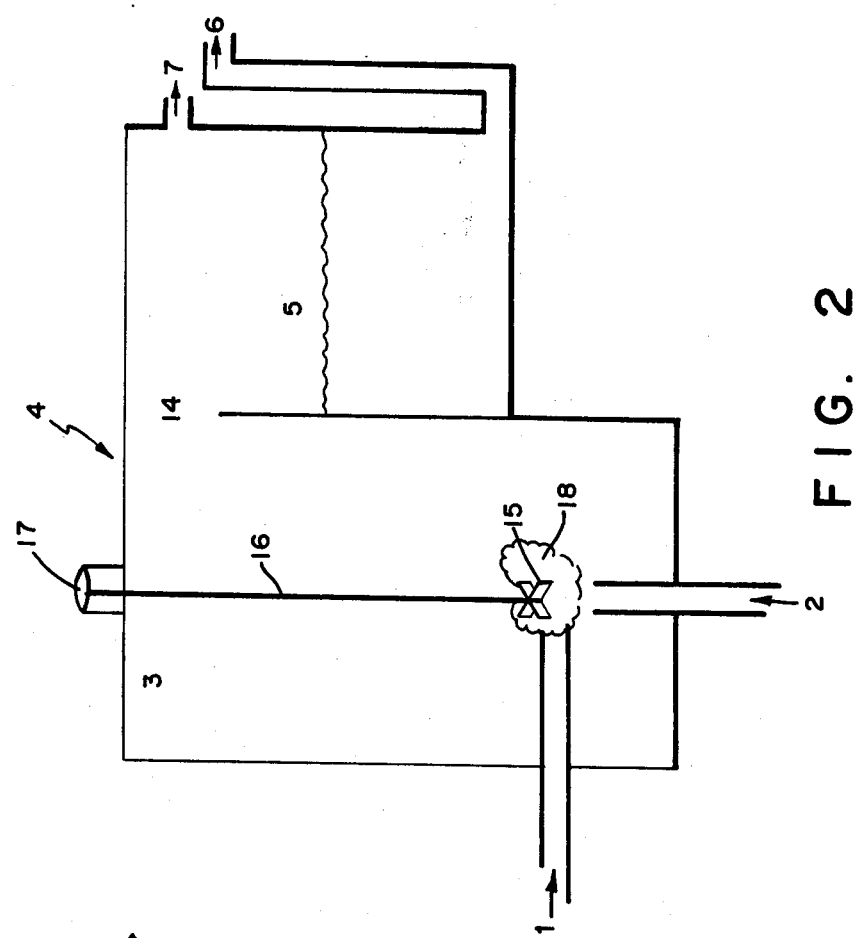
FIG. 2 is a cutaway view of a stripping unit in which the invention is practiced.

With reference to FIG. 2, the invention will be described as it can be carried out in stripping unit 3.

Organic stream 1 and aqueous stream 2 are separately fed to stripping unit 3 where they are mixed. The mixture flows upward and through outlet 14 into settler 5. The ratio of the volume feed rates of the organic and aqueous streams (O/A) is about 0.5 to about 3.0, and advantageously about 0.8 to about 1.2 to optimize stripping of tungsten in the stripping unit. Advantageously, the flow rates of streams 1 and 2 are selected with respect to the volume of stripping unit 3 to provide a residence time of less than about 10 minutes, and more advantageously less than about 6 minutes.

The liquid in stripping unit 3 is under agitation by an impeller 15 which is being rotated via shaft 16 by externally mounted motor 17. Any of several types of impeller can be used. Very satisfactory results have been obtained with a "turbine-type" impeller, having a plurality of blades mounted around the axis of rotation. The impeller can be provided with a shroud to increase pumping action.

Impeller 15 is rotated so as to impart high-shear to a zone 18 around the blades of the impeller. Organic stream 1 is fed into zone 18, and high-shear mixing is imparted to the liquid in zone 18 which is effective to strip tungsten from the organic phase into the aqueous phase and effective to permit recovery from the stripping unit 3 of the tungsten-depleted organic phase and the tungsten-enriched aqueous solution as a liquid mixture which is free of solid reaction products. Such high-shear mixing maximizes the pH gradient between the organic phase and the aqueous solution whereby growth of any precipitated ammonium paratungstate crystals is minimized and the dissolution thereof is maximized. Upon initial contact between the organic phase and the aqueous solution, the aqueous solution is momentarily depleted of ammonia by the stripping reaction and any precipitated ammonium paratungstate crystals can grow to sizes which are not readily redissolved. Effective high-shear mixing instantaneously re-establishes the initial high pH gradient between the organic phase and the aqueous solution thereby minimizing the growth of any precipitated ammonium paratungstate crystals. The effectiveness of the high-shear mixing can be ascertained by observing the initial contact between the phases. The region of initial contact should either remain clear (i.e., no precipitation of ammonium paratungstate) or become temporarily clouded followed by rapid clearing (i.e., precipitation of finely divided ammonium paratungstate followed by rapid redissolution). The high-shear mixing should not be so high, however, as to form an emulsion of the aqueous and organic phases; in such an event, phase separation would be very slow. The mixture is passed to settler 5, in which the organic and aqueous phases readily separate from each other with a desirable clear, well-defined interface. Tungsten is substantially completely stripped from the organic phase into the aqueous phase in the stripping unit; typically, at least about 90% and advantageously at least about 99% of the tungsten is stripped.

The organic stream is fed to the stripping unit at a point near the blades of the impeller 15, where a zone of high shear can readily be established. Advantageously, to maximize contact between the organic phase and the aqueous ammoniacal stripping solution for more efficient stripping, the stripping solution is separately fed to the zone of high shear. One skilled in this art will recognize that the location of the zone of high shear can be readily ascertained, and that the location of this zone is relatively static in a unit operating at steady state. Thus, a stripping unit can be designed by reference to the foregoing description and the following Examples. Operating conditions should be established so that the aqueous phase is the continuous phase in the stripping unit.

Residence times in the stripping unit of less than about 10 minutes, and more advantageously less than about 6 minutes, are preferred so as to increase the rate of production of tungsten-bearing strip liquor, and are feasible by stripping in accordance with this invention. As is well known, the residence time is a function of the stripping unit volume and the total flow rate of liquid (organic phase and aqueous stripping solution) into the stripping unit.

The relatively short retention time in the stripping unit minimizes the opportunity for silica to precipitate within the stripping unit and the mixer-settlers. If silica concentration is relatively high in the feed to the solvent extraction step, significant quantities of silica can enter the stripping operation. In conventional practice, silica then precipitates not only after the stripping operation, but during stripping, necessitating periodic equipment cleaning and special holding and digestion tanks for precipitation and removal of precipitated silica.

While the apparatus shown in FIG. 2 depicts one stripping unit feeding directly to the setttler, the present invention is also applicable to the treatment of a tungsten-bearing organic stream with a plurality of stripping units. For example, two stripping units may be operated in series; in such a case the aqueous-organic mixture formed by operation of the first stripping unit in accordance with the present invention constitutes the feed to the second stripping unit, which in turn further agitates the mixture sufficiently fast to avoid the formation of solid reaction products, and discharges the mixture to the settling unit.

The invention will be further illustrated with reference to the following non-limiting Examples:

EXAMPLE 1

An organic stream composed of 7% ditridecyl amine, 12% isodecanol, and 81% kerosene (by volume), and containing 68.1 gpl of tungsten (as $WO_3$), and an aqueous stream which contained 148 gpl $WO_3$ and sufficient free $NH_3$ to establish a pH of 10.5, were fed separately but simultaneously to a stripping unit at an average O/A ratio of 1 to 1.1. The residence time in the stripping unit was 6 minutes. The organic stream was fed into the stripping unit adjacent the outside edges of a 1¾ inch diameter shrouded radial turbine impeller which was rotating at about 1400 rotations per minute. The aqueous stream was fed into the bottom of the unit. The unit was operating at a temperature of 40° to 45° C. The organic-aqueous mixture leaving the stripping unit contained no solid reaction products. Doubling the total flow rate of the aqueous and organic phases to the unit, e.g., decreasing the retention time to 3 minutes, also generated a discharged organic-aqueous mixture containing no solids. Tungsten transfer from the organic to the aqueous phase was essentially complete.

EXAMPLE 2

An organic stream composed of 7% ditridecyl amine, 12% isodecanol, and 81% kerosene (vol.%), and containing 67.8 gpl of tungsten (as $WO_3$), and an aqueous stream which contained 130 gpl $WO_3$ and sufficient free $NH_3$ to establish a pH of 10.5, were fed separately through the bottom of the stripping unit, at an average O/A ratio of 1 to 1.1. The residence time in the stripping unit was 12 minutes. The organic and aqueous streams were fed into the stripping unit underneath the outside edges of a 1¾ inch diameter shrouded radial turbine impeller, which was rotating at about 1400 rotations per minute. The aqueous stream was also fed into the stripping unit underneath the outside edges of the impeller. Because of the physical arrangement of the inlet streams, back-mixing of the two phases occurred in a region of low shear. Copious quantities of white APT solids were precipitated, and were carried out into the settler compartment. These solids did not redissolve after standing overnight. The problem of solids formation was corrected by relocating the organic inlet such that the organic phase was injected directly into the high-shear zone of the impeller, such that back-mixing was avoided. The aqueous stream was also fed into the stripping unit underneath the impeller.

What is claimed is:

1. A process for stripping tungsten values from a tungsten-bearing acidic liquid organic phase with a basic aqueous ammoniacal phase which comprises: establishing in a stripping unit an intimate mixture of the organic and aqueous phase, the aqueous phase being the continuous phase; establishing a zone of high shear, equivalent to the shear that would be imparted to the mixture adjacent the outside edges of a 1¾ inch diameter radial shrouded turbine impeller rotated in the mixture at about 1400 rotations per minute, within the mixture and near the lower portion of the stripping unit with a high shear mixing device; feeding a stream of the tungsten-bearing acidic liquid organic phase to the zone of high shear and separately feeding the basic aqueous ammonical phase to the mixture while maintaining the aqueous phase as the continuous phase, the organic and aqueous phase being fed to the stripping unit at organic to aqueous volumetric ratios between about 0.5 and about 3, whereby the pH gradient between the organic and aqueous phases is maximized and whereby tungsten values are stripped from the organic phase without precipitating ammonia paratungstate; and withdrawing the mixture from the top of the stripping unit.

2. The process of claim 1 wherein the acidic liquid organic phase contains about 1 to about 200 gpl of tungsten as $WO_3$, the aqueous ammoniacal stripping solution contains about 25 to about 200 gpl of tungstate as $WO_3$ and has a pH of about 9 to about 11.5, and wherein the aqueous ammoniacal stripping solution enriched in tungstate contains about 50 to about 300 gpl of tungstate as $WO_3$.

3. The process of claim 1 wherein the acidic liquid organic phase contains about 1 to about 200 gpl of tungsten as $WO_3$, the aqueous ammoniacal stripping solution contains about 25 to about 200 gpl of tungstate as $WO_3$ and has a pH of about 9 to about 11.5, and wherein the aqueous ammoniacal stripping solution enriched in tungstate contains about 50 to about 300 gpl of tungstate as $WO_3$.

4. The process of claim 1 wherein the acidic liquid organic medium fed to the stripping unit contains about 25 to about 100 gpl of tungsten as $WO_3$, the aqueous ammoniacal stripping medium fed to the stripping unit contains about 100 to about 175 gpl of tungsten as $WO_3$ and has a pH of about 9 to about 11.5, and wherein the aqueous ammoniacal stripping solution enriched in tungstate contains about 150 to about 250 gpl to tungstate as $WO_3$.

5. The process of claim 1 wherein the residence time in the stripping unit is less than about 10 minutes.

6. The process of claim 1 wherein the residence time in the stripping unit is less than about 6 minutes.

* * * * *